No. 860,979. PATENTED JULY 23, 1907.
A. C. KING.
DYNAMO ELECTRIC MACHINE.
APPLICATION FILED DEC. 26, 1906.

WITNESSES:

INVENTOR:
Arthur C. King,
By
Att'y.

UNITED STATES PATENT OFFICE.

ARTHUR C. KING, OF MADISON, WISCONSIN, ASSIGNOR TO NORTHERN ELECTRICAL MANUFACTURING COMPANY, A CORPORATION OF WISCONSIN.

DYNAMO-ELECTRIC MACHINE.

No. 860,979.  Specification of Letters Patent.  Patented July 23, 1907.

Application filed December 26, 1906. Serial No. 349,417.

*To all whom it may concern:*

Be it known that I, ARTHUR C. KING, a citizen of the United States, residing at Madison, county of Dane, State of Wisconsin, have invented certain new and useful Improvements in Dynamo-Electric Machines, of which the following is a specification.

In small electric generators difficulty is sometimes experienced in that, when set in operation, they do not readily build up voltage, making it necessary in such instances to use some separate exciting means until the voltage is built up. This failure of small machines to excite themselves is due to the fact that sufficient residual magnetism is not retained in the field magnet.

The present invention has for its object to cause the field magnet structures in the machines referred to to retain sufficient magnetism to permit the voltage to be built up readily when the machines are set in operation.

To the above end the material of the pole-pieces adjacent the pole faces is transformed into hard steel in any usual manner as, for example, by case-hardening. In this arrangement, since only a thin layer of the poles need be hardened, the permeability of the magnet structure remains practically the same as when the entire pole-pieces are left soft.

Figure 1:
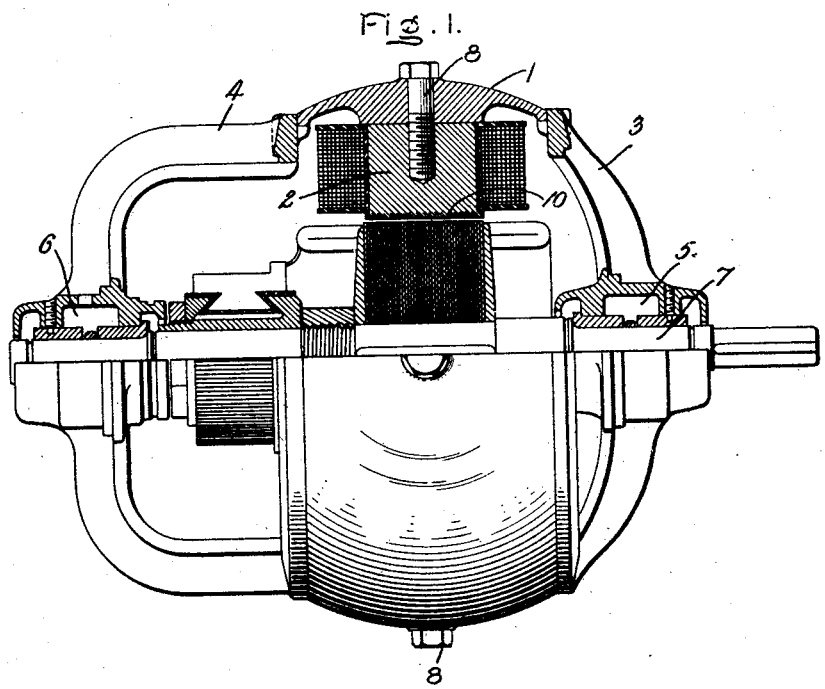
Figure 2:
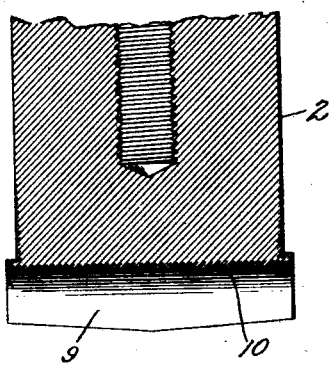

For a more complete understanding of my invention, reference may be had to the following detailed description taken in connection with the accompanying drawing, wherein Figure 1 shows partly in side elevation and partly in longitudinal cross-section a small generator embodying the present invention; and Fig. 2 shows in cross-section, on an enlarged scale, one of the pole-pieces.

Referring to the drawing, 1 indicates the field magnet ring having inwardly-exciting pole-pieces 2, which may be made solid, as shown; 3 and 4 are bonnets or end members having bearings 5 and 6 for supporting the armature shaft 7. All these parts, except as hereinafter specified, may take any usual or preferred forms. The pole-pieces are preferably formed of soft steel, and may be detachably secured to the field magnet ring, as by means of bolts 8. The material of each pole-piece adjacent the pole face 9 is transformed into hard steel by any desired process. This may conveniently be accomplished by case-hardening. The hardened portion is indicated by the doubly-shaded portion 10 which, it will be seen, is in the form of a thin layer or shell, which does not materially reduce the permeability of the field magnet structure. After the hardened portion has once been magnetized it becomes a permanent magnet, advantageously located with respect to the armature, so that a sufficient field is always provided for permitting the generator to build up voltage. The hard layer has a further useful function, that of cutting down the eddy currents in the pole faces, this being due to the fact that the electrical resistance of the hard steel is several times greater than that of the soft steel, and therefore the eddy losses in the pole faces are materially smaller in a machine having hardened pole faces than in other machines.

What I claim as new, and desire to secure by Letters Patent of the United States, is,—

1. In an electric generator, a pole-piece formed of soft steel having its pole face converted into hard steel.

2. An electric generator having solid pole-pieces formed of soft steel which have their pole faces converted into hard steel.

3. A pole-piece for electric generators having a case-hardened pole face.

In witness whereof, I have hereunto set my hand this 21st day of December, 1906.

ARTHUR C. KING.

Witnesses:
T. M. SHEPARD,
JOHN P. MALLETT.